US009918355B2

(12) United States Patent
Gallo

(10) Patent No.: US 9,918,355 B2
(45) Date of Patent: *Mar. 13, 2018

(54) HEATER ASSEMBLY

(71) Applicants: Christopher J. Gallo, Murrieta, CA (US); Joseph A. Sebolt, Canton, OH (US)

(72) Inventor: Christopher J. Gallo, Murrieta, CA (US)

(73) Assignees: Christopher J. Gallo, Murrieta, CA (US); Joseph A. Sebolt, Canton, OH (US)

(*) Notice: Subject to any disclaimer, the term of this patent is extended or adjusted under 35 U.S.C. 154(b) by 60 days.

This patent is subject to a terminal disclaimer.

(21) Appl. No.: 15/162,991

(22) Filed: May 24, 2016

(65) Prior Publication Data
US 2016/0270149 A1    Sep. 15, 2016

Related U.S. Application Data

(63) Continuation of application No. 13/788,002, filed on Mar. 7, 2013, now Pat. No. 9,386,631.

(60) Provisional application No. 61/607,738, filed on Mar. 7, 2012.

(51) Int. Cl.
H05B 1/00        (2006.01)
F24H 3/04        (2006.01)
H04N 21/422      (2011.01)
H04N 5/64        (2006.01)
(Continued)

(52) U.S. Cl.
CPC ............. H05B 1/00 (2013.01); F24H 3/0411 (2013.01); H04N 5/64 (2013.01); H04N 21/414 (2013.01); H04N 21/4131 (2013.01); H04N 21/42212 (2013.01)

(58) Field of Classification Search
CPC ............ H01N 21/4131; H01N 21/414; H01N 21/42212; H01N 21/42204; H01N 21/42208; H04N 5/46; F24H 3/0411; F24H 3/0417; F24H 3/0452; F24H 9/18; F24H 9/63; F24H 9/2071; F24H 9/1854; F24H 9/1818; F24H 9/2064; F24D 19/06; F24D 19/064; F24D 2220/2036; F24D 2220/2054; F24D 2220/2081
See application file for complete search history.

(56) References Cited

U.S. PATENT DOCUMENTS 9,386,631 B2 * 7/2016 Gallo .................. H05B 1/00
2006/0150966 A1   7/2006 Jamieson
2008/0061156 A1   3/2008 Goedde et al.

* cited by examiner

Primary Examiner — Shawntina Fuqua
(74) Attorney, Agent, or Firm — Sand & Sebolt

(57) ABSTRACT

A television/space heater combination device for displaying image content and for heating air and method of using the same is presented. The television/space heater combination device includes a television, a space heater and, sometimes, a frame. The method of use includes activating the space heater; selecting a temperature value for the space heater; generating heat and distributing the same into a room from the space heater; activating the television; and displaying an image on a screen of the television while generating heat with the space heater. The displayed image may be an image of a wood or gas burning fireplace generated by a continuous video loop; or be images from regular television programming or images generated by data transmitted to the television by a remote computer.

11 Claims, 4 Drawing Sheets

(51) Int. Cl.
*H04N 21/414* (2011.01)
*H04N 21/41* (2011.01)

HEATER ASSEMBLY

CROSS-REFERENCE TO RELATED APPLICATIONS

This application is a continuation of U.S. patent application Ser. No. 13/788,002 filed Mar. 7, 2013, which application claims the benefit of U.S. Provisional Patent Application Ser. No. 61/607,738 filed, Mar. 7, 2012, the entire disclosures of which are incorporated herein by reference.

BACKGROUND OF THE INVENTION

Technical Field

The current invention relates generally to apparatus, systems and methods for heating air. More particularly, the apparatus, systems and methods relate to heating air with a space heater. Specifically, the apparatus, systems and methods provide for heating a space with a space heater that is engaged with a television, and where the space heater is operable separately and in combination with the television.

Background Information

Space heaters are used to heat areas of a building or a home without requiring the central heating system to heat the entire home or building. The use of space heaters may reduce the overall heating cost for the building because one room or a couple of rooms may be heated by space heaters to a desired temperature, such as 70° F., while the rest of the building may be heated to a lower temperature, such as 65° F. Space heaters are also popular because they are portable, generally inexpensive, and are capable of being moved from room-to-room.

While space heaters are useful they are often unattractive, have other drawbacks and may cause problems. For example, space heaters tend to only heat the area immediately adjacent the heater and don't distribute heat throughout the area being heated. Additionally, the grill at the rear of the space heater may become clogged with dust and the space heater may therefore overheat or catch fire. Although some space heaters have anti-tipping devices that turn the space heater off if it is tipped over, some space heaters may tip over, overheat and still start a fire.

Space heaters generally include rectangular-shaped boxes made out of plastic or metal which house electrical coils that are heated with electricity. Air is drawn into the interior of the box and is warmed as it passes over the coils. A fan is generally used to draw a volume of air through the coils to create a flow of warm air into the room. Knobs on the exterior of the box are used to control the space heater to adjust temperature and to turn the space heater on and off. Other space heaters may have electric or automatic controls to automatically turn the space heater on and off at desired times. Although currently known space heaters have both desirable and undesirable characteristics, a better space heater is desired.

SUMMARY

A device for heating air which also includes components for displaying images and/or video data. In one embodiment the device comprises a television/space heater combination which includes a television and a space heater engaged with each other. In another aspect, the television/space heater combination device includes a space heater engaged with a television and a frame surrounding the engaged heater and television.

The television utilized in the combination device is preferably a wall mountable high definition television (HDTV). The space heater is engaged with the television and a frame is provided around the television and space heater. The combination device preferably is mountable on a wall. The television/space heater combination device is configured to display an image of a burning flame on the television's screen if desired. Preferably, this is accomplished by including a continually playing video loop in the device. Preferably, the television/space heater combination device is completely assembled when purchased but it will be understood that the individual components may be provided as part of a kit that is assembled by the purchaser. Alternatively, components may be sold which enable a user to retrofit an existing television and space heater and engage the two together in the manner taught herein.

Preferably, the television and space heater are individually controlled by controls on the television/space heater combination device, and a universal remote control preferably is utilized to activate or deactivate one or both devices.

In a second aspect, the controls used to control the space heater are graphically displayed on a portion of the television screen by a control logic provided in a central processing unit of the combination device. For example, the television screen may be a liquid crystal display (LCD) screen and the control logic is configured to display a control panel to control the temperature setting on the LCD. Other controls such as a timer for turning on and off the space heater may also be displayed on the LCD as well as other controls as understood by one of ordinary skill in the art. The screen utilized on the television may be operated by remote or by direct touch on the television screen itself.

A method of operating the television/space heater combination device is also disclosed. The method includes mounting a television/space heater combination device on a vertical wall. Once mounted on the wall, the combination device is set up to display a temperature value on the television screen. The space heater of the television/space heater combination device preferably is separately and individually activated and a temperature value is selected. The temperature value could be set as "low", "high" or an actual pre-set temperature value. The space heater is configured to generate heat to raise the ambient temperature to approximate the temperature value set on the combination device. It will be understood that the television may be on or off while the space heater is generating heat. If the television is off, a video loop depicting images of a wood-burning or gas-burning fireplace may be manually activated and the television configured to display these mages. Preferably, the video loop is a continuous video loop, meaning the images are repeatedly displayed on the television screen. For example, a stored five minute video loop could be repeatedly played.

The method further allows for additionally selecting television programming. This allows a user to view normal television programming on the television screen while the space heater is operating and generating heat. The video loop is automatically deactivated when regular television programming is selected. An electronic device may also be connected, either physically or wirelessly to the television/space heater combination device. For example, when a computer is connected thereto, the television is able to operate as a display for the computer and display the computers' desktop on the television screen. Additionally, images may be uploaded from the computer to the television/space heater combination device. The images may be photographic images or video content and the television may act as an electronic picture book and display the images one after each other (or in a random or other order). Each image is displayed for a predetermined time or a random time. The television may be operated independent of the space heater and the space heater may be operated independent of the television or the space heater and television may be operated at the same time.

BRIEF DESCRIPTION OF THE DRAWINGS

The preferred embodiment of the invention, illustrative of the best mode in which Applicant has contemplated applying the principles of the invention, are set forth in the following description and are shown in the drawings.

Similar numbers refer to similar parts throughout the drawings.

DETAILED DESCRIPTION

Figure 1:
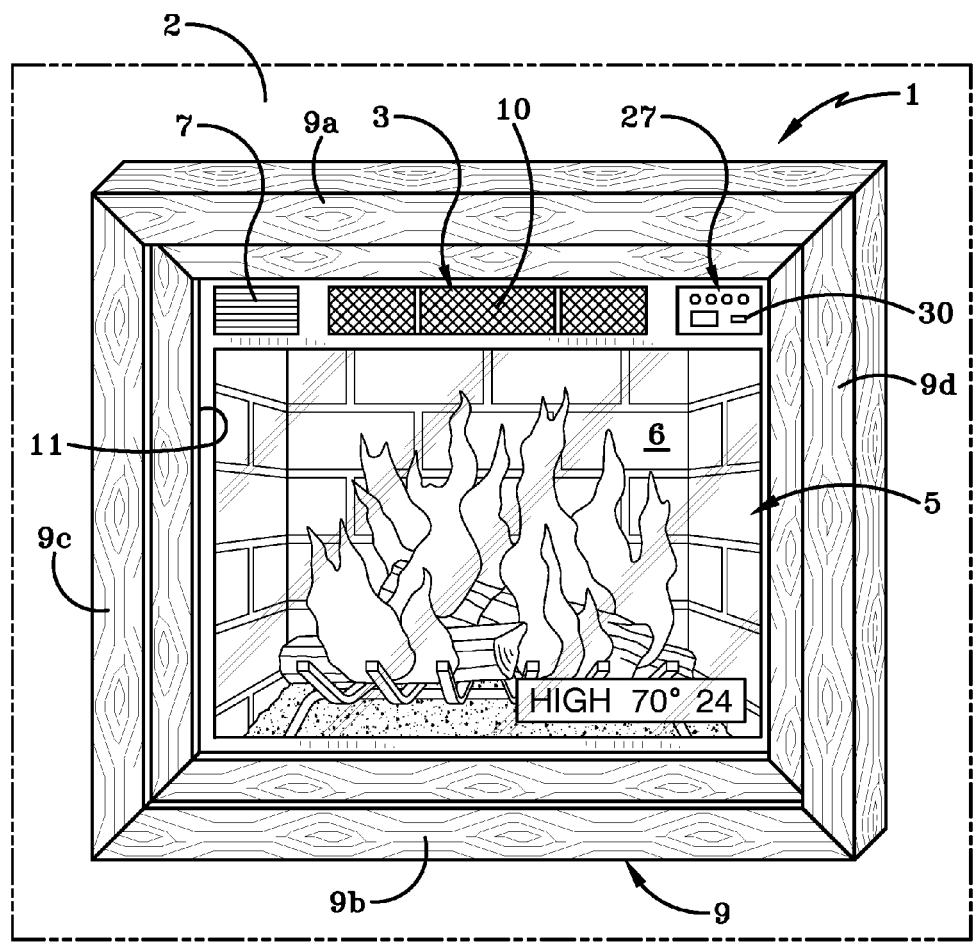
FIG. 1 is a front view of a first embodiment of a television/space heater combination device mounted on a wall and showing the space heater disposed above the television screen (which is displaying an image of a wood-burning fireplace) and the spacer heater and television surrounded by a decorative frame.

FIG. 1 illustrates a first preferred embodiment of a decorative television/space heater combination device, generally indicated at 1. Device 1 is shown mounted on a vertical wall 2. Device 1 comprises a space heater 3 and a television 5 which are engaged with each other and mounted in a decorative frame 9. Space heater 3, television 5 and frame 9 are all pre-assembled into the television/space heater combination device 1 illustrated in FIG. 1 and little to no assembly is required after purchase. The purchaser will simply mount frame 9 including the television/space heater onto wall 2 and device 1 is then ready for operation. It will be understood that television 5 and space heater 3 may be fabricated as separate components and then secured together by any suitable means such as by way of fastener brackets. Alternatively, television 5 and space heater 3 may be fabricated into a single or integral device and then mounted within frame 9.

Space heater 3 preferably is an electrical heater that is constructed and operates as other presently known electric space heaters that are utilized for heat defined spaces. Although not illustrated herein, space heater 3 therefore will include some type of heat generating mechanism, such as electric coils, and a fan disposed adjacent the coils. Space heater 3 will further include wiring that is adapted to be operatively connected to a power source such as a wall outlet (not shown). Space heater 3 will further include an air intake (not shown) and a vent 10. The fan preferably will be disposed adjacent vent 10 and is utilized to draw ambient air from the room through the air intake and into an interior of space heater 3. The fan moves the air across the electric coils of the heat generating mechanism, and then pushes the subsequently warmed air through vent 10 and back into the room.

Television 5 may be any desired type of television, however, in the preferred embodiment it is envisioned that television 5 preferably is a flat panel television. For example, the television illustrated is a high definition television (HDTV) or any other type of flat panel television that is capable of being wall mounted. Television 5 preferably includes one or more speakers 7 built into a frame of the television/space heater combination device 1. Speaker 7 may be positioned in any one of a number of locations on device 1. Specifically, speaker 7 may be positioned in a location other than that shown in FIG. 1; and any number of speakers may be provided on device 1. Television 5 further includes a screen 6 configured for displaying an image thereon. When television 5 is activated to show regular television programming, the images of the regular television programming are displayed on the screen 6.

Frame 9 is mounted around the television 5 and space heater 3. In particular, frame 9 includes a top member 9a, a bottom member 9b, a left side member 9c, and a right side member 9d. Top, bottom, left and right side members 9a-9d define and bound an aperture 11 within which television 5 and space heater 3 are mounted. Frame 9 may be fabricated from any suitable materials such as metal, wood or combinations of the same.

Device 1 further includes a control panel 27 which includes control capable of operating space heater 3 and television 5. Control panel 27 may include a central processing unit which is operatively connected to space heater and television 5. The controls are used to switch space heater 3 on and off and to set the temperature to which the heater will warm the air in the room. The controls on control panel 27 are further used to switch television 5 on and off and to change channels as necessary. As such, controls on control panel 27 allow space heater 3 and television 5 to be separately and independently operated. In other words, television 3 may operate independent of space heater 3; space heater 3 may operate independent of television 5; or space heater 3 and television 5 may operate together or at least partially together.

Figure 4:
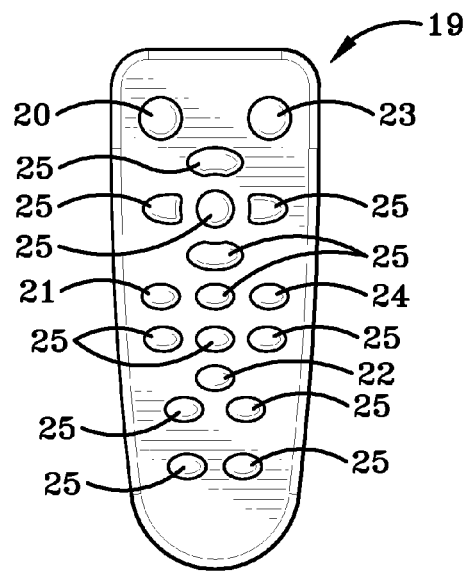
FIG. 4 is a top view of a remote control operable to control the television/space heater combination device.

Control panel 27 may be operated wirelessly by a handheld remote control 19. FIG. 4 illustrates a remote control 19 suitable for use to operate control panel 27. In particular, remote control 19 includes an on/off button 20, a low heat button 21, a fan only button 22, a fireplace image/television video button 23 and a high heat button 24. The remote control 19 also contains a standard set of buttons 25 to control regular television functions. If a user desires to watch regular television, they use buttons 25 to do so. If the user additionally wishes to generate heat while watching regular television, they engage either low heat button 21 or high heat button 24. If they simply wish to circulate air in the room while watching regular television, they will engage the fan only button 22. If the user does not wish to watch regular television but does wish to heat the room, the user will select the desired temperature level using one or the other of buttons 21 and 24. It will be understood that control panel 27 and/or remote control 19 may further include buttons which enable the user to set a specific temperature value other than simply a "high heat" or "low heat" setting.

Television/space heater combination device may also include a thermostat (not shown) which is operable to sense the ambient temperature and to automatically adjust the space heater settings accordingly. The inclusion of a thermostat enables the user to control the heat output from the combination device based on a specific temperature value that is selected by the user when operating remote control 19 or control panel 27.

The user may additionally select button 23 on remote control 19. When engaged, button 23 controls the display of an image of a wood-burning or gas-burning fireplace (such as is illustrated in FIG. 1) on screen 6 of television 5. Thus, device 1 may be used in such a fashion as to simulate a fireplace in that an image of a wood-burning or gas-burning fireplace is displayed on screen 6 while heat is blown out of vent 10.

Control panel 27 preferably is also provided with an input/output (I/O) port 30. This port 30 may be used to connect television 5 to a remote electronic device, such as a computer (not shown), so that television screen 6 may act as a display, projecting images from the electronic device onto the screen 6. For example, the television screen could display the computer desktop of a computer connected to the port 30. The port 30 is a universal serial bus (USB) port or any other type of port. It will be understood that, alternatively, signals may be transmitted wirelessly or otherwise from a remote electronic device to television 5 in order to display selected images on screen 6.

Alternatively, control logic on television/space heater combination device 1 is configured to graphically display controls used to operate space heater 3 on screen 6. It should be understood that the term "logic", as used herein, includes but is not limited to hardware, firmware, software and/or combinations of each to perform a function(s) or an action (s), and/or to cause a function or action from another logic, method, and/or system. For example, based on a desired application or need, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

For example, as shown in FIG. 1, a control display 8 is displayed on screen 6 of the television 5 for controlling the temperature of space heater 3. These controls are operated using remote control 19 to select a desired temperature setting. Timer controls may also be displayed on the control display 8 for operating a timer. For example, controls for a start time and an end time for operating space heater 3 are displayed by the control logic on television screen 6 and are operated using remote control 19. Any other desired types of controls useful for controlling space heater 3 and television 5, individually, may also be displayed on the control display 8 and be operated using remote control 19.

Television/space heater combination device 1 may further include data stored in a central processing unit (not shown) or other electronic device (not shown) such as a memory. In addition to a memory, the electronic device could be implemented with an application specific integrated circuit (ASIC), a floating programmable point gate array (FPGA) and/or another type of device that may store data and generate a display on screen 6 of television 5. Preferably, the data contains video images for displaying wood-burning or gas-burning fireplace images on the television screen 6. For example, the fireplace images could be five minutes of video images that are continually replayed on the television screen 6 when the television 5 is not being used to watch regular television programming (such as that transmitted thereto by cable or satellite dish.)

In other configurations, television/space heater combination device 1 includes appropriate ports for enabling device 1 to connect to a recording and/or play back device such as a digital video disc (DVD) player, a video home system (VHS) or another type of electronic device. Alternatively, another configuration of the preferred embodiment may include a recording/playback device built into the television/space heater combination device 1. Thus, a DVD player, a VHS and/or a computer may be incorporated into television/space heater combination device 1. A USB port may also be included in device 1 to allow a Wi-Fi connection for a wireless network. Of course, those of ordinary skill in the art will appreciate that other devices and features could be built into or connected to the television/space heater combination device 1 and that the television/space heater combination device 1 is preferably pre-assembled before purchase.

Figure 2:
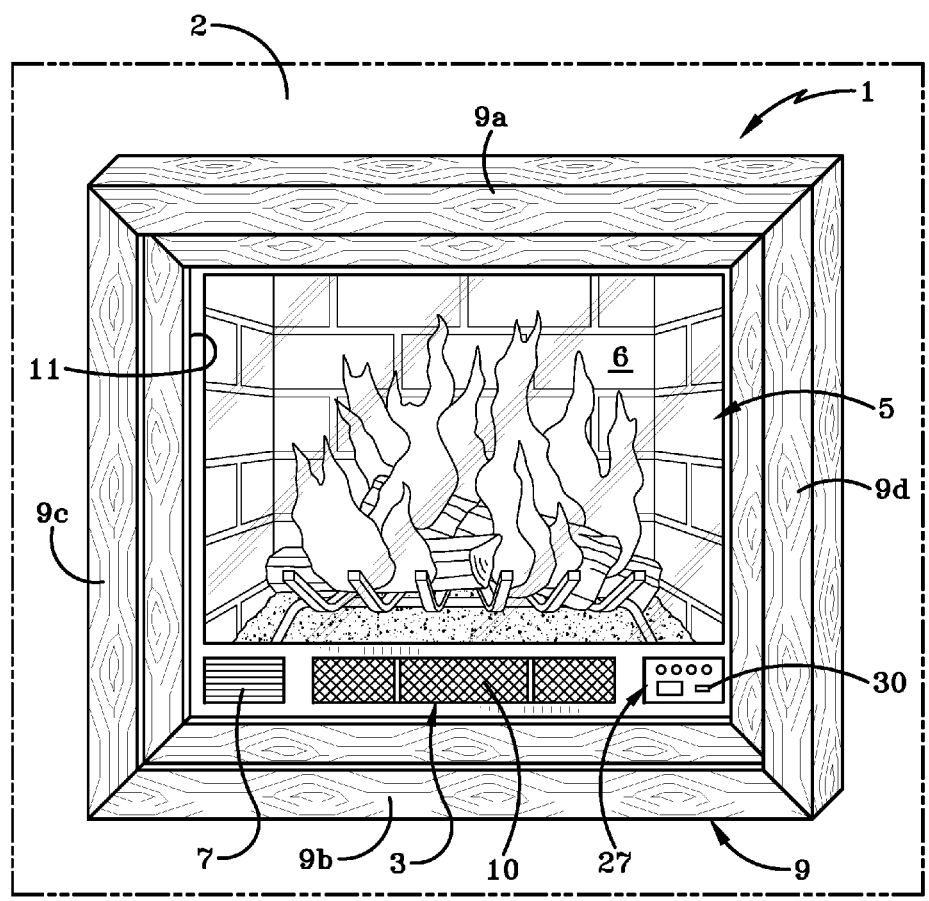
FIG. 2 is a front view of a second embodiment of a television/space heater combination device mounted on a wall and showing the space heater disposed below the television screen which again is displaying an image of a wood-burning fireplace.

FIG. 2 shows a second embodiment of a television/space heater combination device. In this second embodiment, space heater 3 is positioned adjacent a bottom region of television 5 instead of adjacent a top region thereof (shown in FIG. 1). Again, space heater 5 and television 3 are either secured to each other by brackets or some other suitable means, or are integrally fabricated with each other. A frame 9 surrounds the television and space heater combination. It will be understood that instead of the space heater being disposed vertically above or beneath television 5, space heater 3 may be provided partially above and partially below television 5, or on either or both of the left and right hand sides of television 5.

Figure 3:
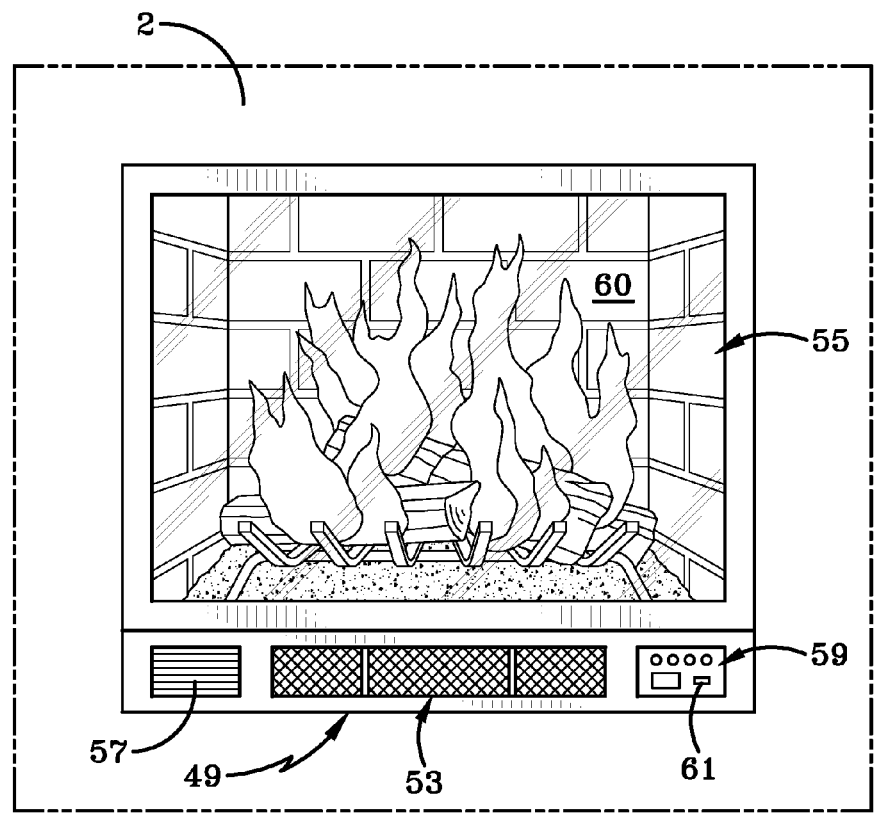
FIG. 3 is a front view of a third embodiment of a television/space heater device mounted on a wall, where the frame is omitted and the device comprises a separate television and a separate space heater that have been secured together prior to mounting on the wall.

FIG. 3 shows a third embodiment of a television/space heater combination device. In this third embodiment the frame is omitted and a space heater 53 and a television 55 are detachably engaged with each other by any suitable means such as connector brackets. Space heater 53 is disposed adjacent a bottom region of television 55 and the combination device 49 is mounted to a wall 2 using a standard television wall mount (not shown). Because space heater 53 and television 55 are separate components, they may be purchased separately and later assembled as a single television/space heater unit combination 49. It will be understood that a separate frame similar to the frame 9 of FIGS. 1 and 2 may also be separately purchased and subsequently engaged with this television/space heater unit combination 49 if desired. It will be understood that space heater 53 may be disposed above a top region of television 55 or adjacent one of the sides thereof, instead of being disposed below a bottom region of television 55.

Television/space heater combination device 49 includes a control panel 59, a speaker 57 and an air intake/vent 53. Control panel 59 is similar to control panel 27 and includes buttons used to turn space heater 53 and/or television 55 on and off. Other buttons are provided for setting the temperature level of the space heater 53 to one of a low temperature level, a high temperature level, or another specific temperature level. As with the first embodiment, control panel also enables the user to display the image of a wood-burning or gas-burning fireplace on the television screen 60 when regular television programming is not being viewed. The control panel 59 may have an input/output (I/O) port 30 useful for connecting television 55 to an electronic device such as a computer. In this way the television screen 60 may act as a display projecting images from the electronic device onto the screen. For example, the television screen could display the computer desktop of a computer connected to the port 30.

Having described the components and the assembly of the decorative television/space heater combination device 1, we will now discuss an example method of the use and operation thereof. The example methods may be better appreciated with reference to the flow diagram shown in FIG. 5. While for purposes of simplicity of explanation, the illustrated methodologies are shown and described as a series of blocks, it is to be appreciated that the methodologies are not limited by the order of the blocks, as some blocks may occur in different orders and/or concurrently with other blocks from those shown and described. Moreover, less than all the illustrated blocks may be required to implement an example methodology. Blocks may be combined or separated into multiple components. Furthermore, additional and/or alternative methodologies may employ additional, not illustrated blocks.

Figure 5:
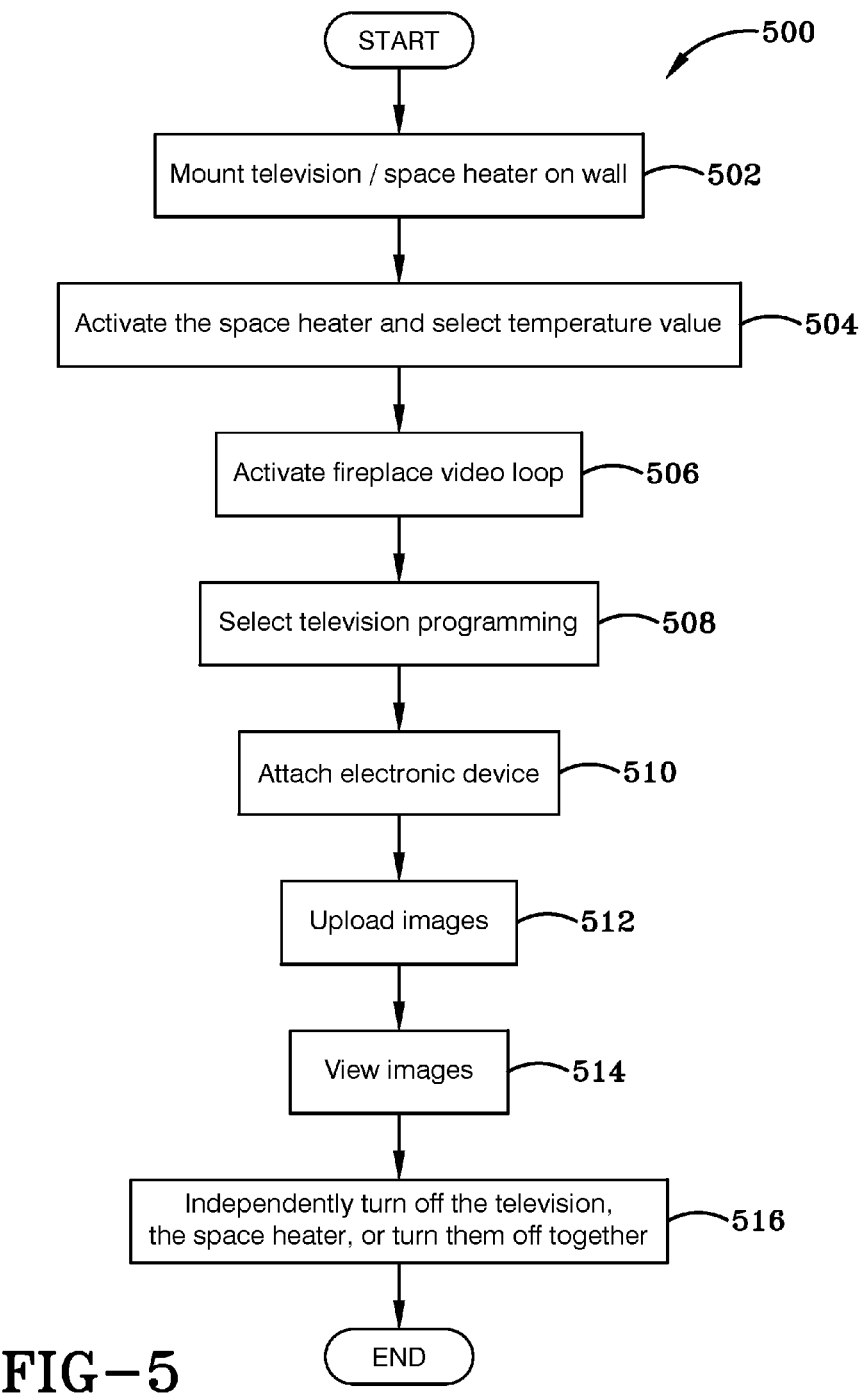
FIG. 5 is a flow-chart illustrating an exemplary method of using and operating a television/space heater combination device.

FIG. 5 illustrates a method 500 of using the television/space heater combination device 1 or 2 discussed above or variations thereof. The method 500 begins by mounting a television/space heater combination device 1 on a wall, as at 502. Television/space heater combination device 1 is activated using remote control 19 and the settings of space heater 3 are adjusted by selecting a temperature value as at 504. (Each of the actions taken to control the television/space heater combination device may be performed with controls built into the television/space heater combination device, with remote control device 19 or by another method such as voice-activated command, as understood by those of ordinary skill in the art.) The temperature value selected may be "low", "high" or an actual temperature value, e.g. 72° F. At this point, the television 5 is still off and only the space heater 3 is generating heat.

The next step in the method may be the activation 506 of the fireplace video loop by engaging the appropriate control on remote control 19. The activation of this loop causes an image of a wood-burning or gas-burning fireplace to be displayed on the screen 6 of television 5.

The user may determine they wish to view regularly scheduled television programming, a DVD or the like. The method 500 therefore continues, at 508, by selecting television programming by engaging the appropriate controls on remote control 19 or otherwise Activation of this feature preferably automatically shuts off the fireplace video loop. The selection of viewing television programming does not affect space heater operation and, thus, the user is able to view regular television programming while the space heater 3 continues to generate heat.

The method may further include the step of engaging a remote electronic device, as at 510, either wirelessly or by physically connecting the electronic device to combination device 1 via port 30. For example, the user may connect a remote computer to combination device 1 so that the computers' desktop is displayed on screen 6. When this occurs, the display of regular television programming is automatically deactivated. Images may be uploaded to the television/space heater combination device 1 from the remote computer as at 512. The images may be photographic images and the television may act as an electronic picture book and display the images one after another (or in a random or other order) for a predetermined time, for a random time duration, or for another period of time. This allows the user to view the images, as at step 514.

When the user no longer wishes to generate heat and/or utilize television 5, the television 5 and/or space heater 3 is deactivated, as at step 516.

In another version of the method 500, the television/space heater combination device could detect the space heater has been activated and that the television is off. Upon detecting this, the television/space heater combination device 1 could automatically turn on a video stream loop that repeatedly shows a burning fireplace loop or repeatedly shows a similar heat/warmth related loop over and over on the television's screen 6.

It will be understood that while the above embodiments have been disclosed as being a television/space heater combination device that is mountable on a wall, the device may instead have a housing instead of a picture-type frame. The housing may be configured to surround the top, bottom, sides and back of the television and space heater, and be positionable on a horizontal, flat surface, such as a floor or on a shelf of a display unit. Again, in this differently configured "frame" (i.e., housing), the space heater may be disposed vertically above the television screen, or vertically beneath the television screen, or partially above and below the screen, or even on either or both of the left and right hand sides of the television screen.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

The invention claimed is:

1. In combination:
   a television having a top, a bottom, a left side and a right side;
   a screen provided on the television and extending across a front thereof;
   a space heater that is secured to the television and positioned adjacent one of the top, bottom, left side and right side of the television; said space heater including one or more vents for directing air heated by the space heater into a room in which the television is located, and wherein heated air flows out of the one or more vents and away from the television;
   a central processing unit provided on one or the other of the television and the space heater; and
   control logic provided in the central processing unit to operate one or both of the television and the space heater.

2. The combination as defined in claim 1, wherein the control logic is programmed to selectively display space heater control functions on the television screen.

3. The combination as defined in claim 1, wherein the control logic is adapted to display an image including a wood-burning fireplace on at least a portion of the television screen.

4. The combination as defined in claim 1, wherein the control logic is adapted to display an image that includes a visual of a gas-burning fireplace on at least a portion of the television screen.

5. The combination as defined in claim 1, wherein the control logic is adapted to selectively display an image other than regular television programming on at least a portion of the television screen.

6. The combination as defined in claim 5, wherein the control logic is adapted to display an image that includes a temperature display on at least a portion of the television screen.

7. The combination as defined in claim 1, wherein the control logic is programmable to display an image of a wood-burning or a gas-burning fireplace on the television screen only when the television is not operated to display regular television programming on the screen.

8. The combination as defined in claim 1, wherein the space heater includes:
   an air intake; and
   a heat generator mechanism disposed between the air intake and the one or more vents, said heat generator mechanism being adapted to generate heat; wherein heat generated by the heat generator mechanism is adapted to heat air drawn into the space heater via the air intake from air in the room in which the television is located, and the space heater is adapted to cause air heated by the heat generator mechanism to flow through the one or more vents and outwardly into the air in the room in which the television is located and away from the television.

9. The combination as defined in claim 8, further comprising a fan disposed within an interior of the space heater adjacent the one or more vents; and wherein the fan is adapted to blow heated air outwardly through the one or more vents.

10. The combination as defined in claim 1, wherein the space heater further comprises a thermostat operatively linked to the central processing unit and the thermostat is operable by way of the control logic provided in the central processing unit.

11. The combination as defined in claim 1, further comprising a remote control device; and wherein the remote control device selectively controls one or both of the television and the space heater.

* * * * *